United States Patent
Song et al.

(10) Patent No.: US 12,504,867 B2
(45) Date of Patent: Dec. 23, 2025

(54) AREA SELECTION-BASED DOCUMENT OBJECT MODEL ELEMENT INSPECTOR

(71) Applicant: eBay Inc., San Jose, CA (US)

(72) Inventors: Dan Song, Shanghai (CN); Pei Wang, Shanghai (CN); Yufei Wang, Shanghai (CN); Feng Xie, Shanghai (CN); Kun Yu, Shanghai (CN); Xiaojie Zang, Shanghai (CN)

(73) Assignee: eBay Inc., San Jose, CA (US)

( * ) Notice: Subject to any disclaimer, the term of this patent is extended or adjusted under 35 U.S.C. 154(b) by 250 days.

(21) Appl. No.: 18/237,491

(22) Filed: Aug. 24, 2023

(65) Prior Publication Data

US 2025/0068310 A1 Feb. 27, 2025

(51) Int. Cl.
*G06F 3/04842* (2022.01)
*G06F 3/0482* (2013.01)

(52) U.S. Cl.
CPC ........ *G06F 3/04842* (2013.01); *G06F 3/0482* (2013.01)

(58) Field of Classification Search
CPC .. G06F 3/04842; G06F 3/0482; G06F 3/0481; G06F 9/451; G06F 16/958; G06F 40/143
See application file for complete search history.

(56) References Cited

U.S. PATENT DOCUMENTS

| | | | |
|---|---|---|---|
| 7,769,773 B1 | 8/2010 | Doubek et al. | |
| 8,413,061 B2 | 4/2013 | Sawant | |
| 9,241,004 B1 | 1/2016 | April | |
| 9,438,625 B1 | 9/2016 | Yang | |
| 9,507,571 B2 | 11/2016 | Rempell | |
| 10,089,002 B2 * | 10/2018 | Nugent | G06F 3/04842 |
| 10,185,782 B2 | 1/2019 | Decker et al. | |
| 10,198,408 B1 | 2/2019 | Commisso | |
| 10,572,126 B2 | 2/2020 | Fitzpatrick | |
| 10,728,274 B2 | 7/2020 | Uriel et al. | |
| 2008/0168388 A1 * | 7/2008 | Decker | G06F 40/166 715/800 |
| 2017/0285914 A1 * | 10/2017 | Ellbogen | G06F 3/0482 |
| 2020/0293592 A1 | 9/2020 | Kumar et al. | |
| 2021/0286935 A1 | 9/2021 | Burpulis et al. | |
| 2022/0303289 A1 | 9/2022 | Townsend et al. | |

OTHER PUBLICATIONS

"Open the Inspector", Firefox Source Docs [retrieved Jun. 12, 2023]. Retrieved from the Internet <https://firefox-source-docs.mozilla.org/devtools-user/page_inspector/how_to/open_the_inspector/index.html>., 3 Pages.

Basques, Kayce, et al., "Get started with viewing and changing the DOM", Google Developers [retrieved Jun. 12, 2023]. Retrieved from the Internet <https://developer.chrome.com/docs/devtools/dom/>., Mar. 1, 2019, 26 Pages.

* cited by examiner

*Primary Examiner* — Cao H Nguyen

(74) *Attorney, Agent, or Firm* — FIG. 1 Patents

(57) ABSTRACT

An area selection-based document object model element inspector is described. A dragging input that defines a selection area of a digital content document having a plurality of elements is received via an area selection-based inspector tool. A set of elements of the plurality of elements that is positioned within the selection area is selected. Details of the selected set of elements are broadcast for display.

17 Claims, 5 Drawing Sheets

AREA SELECTION-BASED DOCUMENT OBJECT MODEL ELEMENT INSPECTOR

BACKGROUND

Digital content is configurable to include a plurality of elements (or objects) as a part of digital images, design of a user interface, webpages, digital multimedia, digital documents, and so forth. Oftentimes, this plurality of elements includes overlapping elements, elements that are nested within each other, and so forth. This structure presents a challenge to conventional techniques supported by computing devices to select and interact with individual elements within the digital content for the purpose of document inspection. For example, a document object model (DOM) inspector is a tool or feature provided by a web browser or other web development application that allows users (e.g., developers) to inspect and analyze a structure, property, and/or styling of DOM elements of a webpage.

Consider an example of a collection of elements that are visually nested and layered with respect to each other, such as when a foreground element is layered on top of a background element and/or a hidden element. To inspect a target element of the collection of elements, the user may click the target element or a corresponding code segment using the DOM inspector, for example. However, if the target element is covered by others, it may be difficult or may not be possible to select the target element directly. This results in user frustration and inefficient use of computational resources caused by the user repeatedly selecting, for example, the foreground element while trying to find a selection point for the background element.

SUMMARY

An area selection-based document object model element inspector is described. A dragging input that defines a selection area of a digital content document having a plurality of elements is received via an area selection-based inspector tool. A set of elements of the plurality of elements that is positioned within the selection area is selected. Details of the selected set of elements are broadcast for display.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
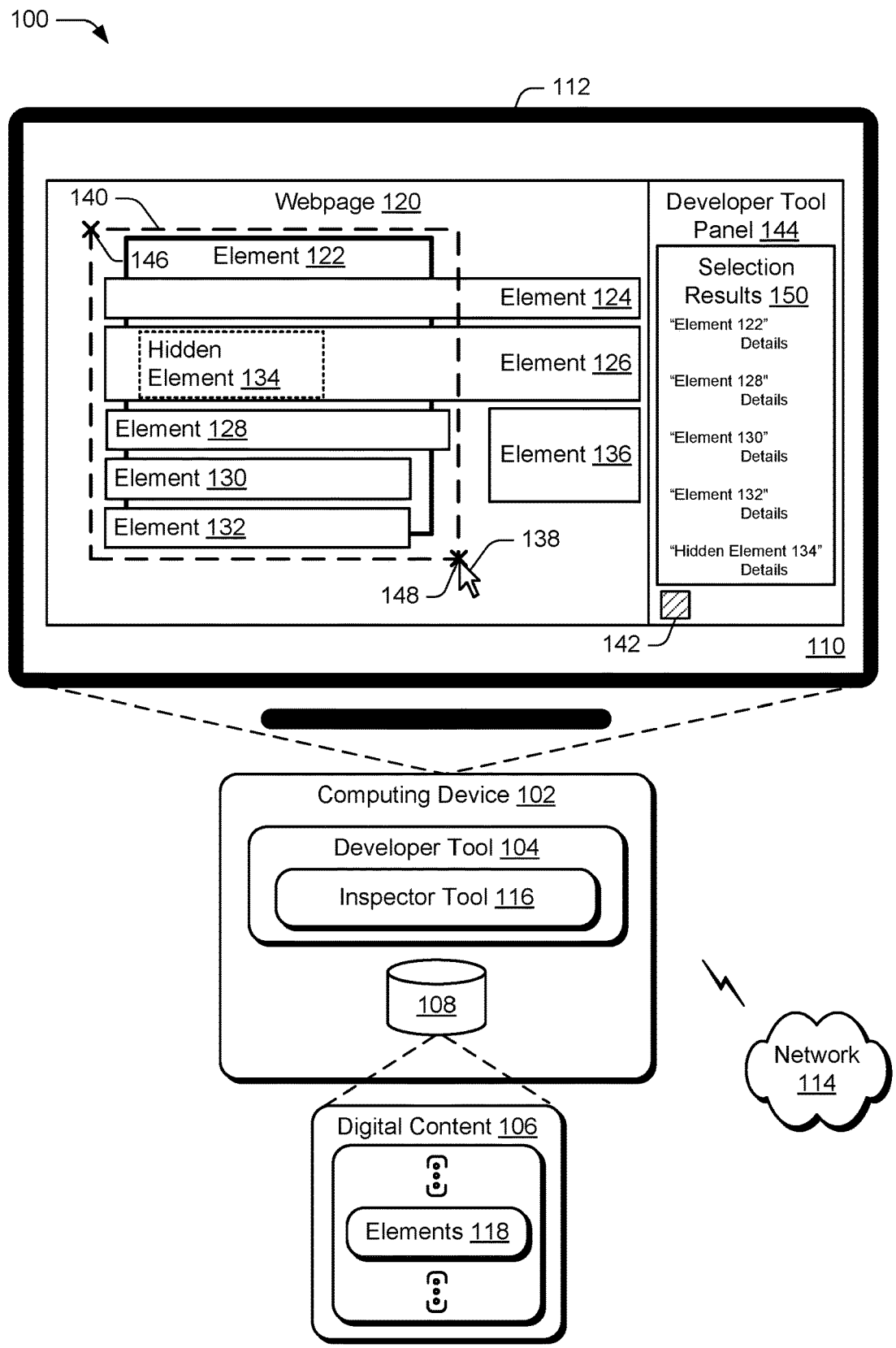
FIG. 1 is an illustration of an environment in an example implementation that is operable to employ area selection-based document object model element inspector techniques described herein.

The complexity of digital content is ever increasing. Consider an example of digital content configured as a webpage. Initially, webpages included a simple body of text and a title. As webpages evolved, a multitude of graphics, art, buttons, portions that support streaming, and so on were included. Consequently, however, creation, editing, and interaction with this digital content has become increasingly complicated by nesting and overlapping arrangements of objects used to form the digital content. This results in user frustration and inefficient use of computational resources as part of editing and interacting with this digital content.

For instance, developers may use inspector tools to explore the hierarchical structure of digital content elements, their attributes, and relationships, making it easier to understand and manipulate the structure of the webpage for development, performance profiling, and debugging purposes. Continuing the webpage example above, consider an example in which the webpage includes multiple objects that overlap, are nested within each other (e.g., a boundary of a first object is included within a boundary of a second object), and so on. Conventional techniques used to select a target object with an inspector tool involve single point selections (e.g., at a single location within the user interface), and it may be difficult or not possible to select the target object when it is hidden from view or covered by others. These conventional techniques are thus inefficient with respect to computing resources, prone to error, and result in user frustration.

Accordingly, an area selection-based document object model (DOM) element inspector is described. This results in increased efficiency in user interaction and computational resource consumption, particularly with respect to the field of user interfaces. For example, the inspector tool described herein enables DOM elements to be selected based on their geometric position, independent from the hierarchical structure described above, which provides a more intuitive, convenient, and user-friendly interaction. In accordance with the techniques described herein, the field of user interfaces is improved by enabling efficient batch selection of DOM elements within an area (e.g., a geometric region), regardless of whether an element is obscured and/or inaccessible due to overlap with other elements or hidden from display.

In one example, a user input is received as a dragging input that defines a selection area of a digital content document (e.g., a webpage) while the inspector tool is active. The dragging input defines, for instance, a starting point of the selection area and an ending point of the selection area with respect to coordinates of the digital content document. The inspector tool includes functionality to generate a mask as an overlay on the digital content document that corresponds to the selection area, thus overlapping with and covering the DOM elements within the selection area. The inspector tool further includes functionality to generate an array of the DOM elements by removing and/or ignoring the hierarchical structure information and instead arranging the DOM elements based on size and coordinate position information. The array, for instance, treats the DOM elements as if they have a same z-index value and exist on a same layer or plane. Thus, a first element that overlaps a second element at a given coordinate position no longer obscures the second element for selection purposes.

As a part of performing an area-based selection, the inspector tool further includes functionality to compare a boundary of the mask to the size and coordinate position of individual DOM elements to determine which of the DOM elements are overlapped by the mask, and thus within the selection area. A DOM element is within the selection area when its bounding rectangle, as determined by the size and coordinate position information, is completely within the boundary of the mask. In contrast, a DOM element is not within the selection area when at least a portion of its bounding rectangle is outside of the boundary of the mask.

DOM elements within the selection area are indicated as selected, such as visually indicated (e.g., highlighted) and/or listed within a set of selection results. The selection results may be displayed via a display device of the user interface. The selection results, for instance, include name(s) of the selected DOM element(s) as well as details associated with the selected DOM element(s), such as path details, structural details, attribute and style details, and/or other details that affect how the corresponding DOM element appears on the digital content document and/or interacts with the other DOM elements. The details of the selected DOM element(s) are editable via a developer tool panel. The developer tool panel may be is displayed with the digital content document, for example, via the display device. As a result, the methods and systems described herein overcome the challenges of conventional techniques with respect to DOM inspectors for increased user efficiency and increased computational efficiency. Further discussion of these and other examples is included in the following sections and shown in corresponding figures.

In the following discussion, an example environment is first described that may employ the techniques described herein. Examples of implementation details and procedures are then described which may be performed in the example environment as well as other environments. Performance of the example procedures is not limited to the example environment and the example environment is not limited to performance of the example procedures.

Example of an Environment

FIG. 1 is an illustration of an environment 100 in an example implementation that is operable to employ area selection-based document object model element inspector techniques described herein. The illustrated environment 100 includes a computing device 102, which is configurable in a variety of ways. The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud," as described in FIG. 5

The computing device 102 is illustrated as including a developer tool 104. Generally, the developer tool 104 represents an application or functionality of the computing device 102 (and/or accessed by the computing device 102) to design, create, and/or modify digital content 106. As described herein, digital content 106 may include any type of digital content that is designed, created, or edited using developer tool 104, including, by way of example and not limitation, graphics, text, digital presentations, documents, videos, images, webpages, and so forth. The developer tool 104 may further be representative of more than one application (e.g., a suite of applications) that supports functionality to perform content editing and inspection operations on various types of digital content 106 without departing from the spirit or scope of the techniques described herein.

The developer tool 104 is implemented at least partially in hardware of the computing device 102 to create, edit, and inspect digital content 106, which is at least partially maintained in storage 108 of the computing device 102. For example, the developer tool 104 may enable creation of the digital content 106, modification of the digital content 106, and rendering of the digital content 106 in a user interface 110 for output, e.g., by a display device 112. The user interface 110 includes functionality (e.g., hardware and/or software-based functionality) for generating outputs (e.g., via the display device 112) as well as for receiving inputs.

Although illustrated as implemented locally at the computing device 102, functionality of the developer tool 104 is also configurable as a whole or in part via functionality available via the network 114, such as part of a web service or "in the cloud." Moreover, the digital content 106 may also represent digital content accessible to the computing device 102 in other ways, e.g., accessible to the computing device 102 from storage of another device over the network 114. As mentioned above, examples of the digital content 106 include digital images, digital media, webpages, digital documents, and any other form of content that is configured for rendering and display by the display device 112 in the user interface 110. In one or more implementations, at least a portion of the functionality provided by the developer tool 104 is accessed via a web browser, such as via a web browser extension or plug-in.

The developer tool 104 includes an inspector tool 116 that enables users to inspect and analyze the structure, properties, and styling of digital content elements 118 ("elements 118") within the digital content 106. As described herein, the elements 118 can include any element or object that is included within the digital content 106, including, by way of example and not limitation, images, text, points, lines, basic shapes (e.g., rectangles, squares, ellipses, circles, triangles, and so on), vector objects, raster objects, user-defined shapes (e.g., created by drawing and connecting a series of lines), and so forth. Non-limiting examples of the elements 118 further include representations of executable functionalities that are selectable via the representations (e.g., buttons, controls, sliders, radial dials, media controls), and so forth. The elements, for instance, are document object model (DOM) elements, and the inspector tool 116 is a DOM inspector.

As a number of elements 118 included in the digital content 106 increases, so too does the complexity of selecting and interacting with the elements 118 via the inspector tool 116. As an example of this, FIG. 1 shows a webpage 120 broadcast for display on the user interface 110. In at least one implementation, the webpage 120 is a digital content document that is created and structured in a markup language, such as hypertext markup language (HTML) or extensible markup language (XML). By way of example, HTML uses tags (such as headings, paragraphs, images, links, etc.) to mark up the elements. The tags allow the user interface 110 to interpret and render these elements accordingly for display via the display device 112. As a part of this, the webpage 120 may utilize a DOM as a programming interface that represents the structure and content of the markup document as a hierarchical, tree-like structure. The DOM provides a way for programs, such as web browsers or JavaScript scripts, to interact with and manipulate the elements 118 within the webpage 120. Although the webpage 120 is described in the present example, it is to be appreciated that the techniques described herein may be applicable to other types of digital content 106. As such, the webpage 120 provides one example of the digital content 106.

In the depicted example of the webpage 120, the elements 118 include an element 122 that is positioned behind, and at least partially overlapping with, a plurality of other elements. The element 122 is indicated with a thicker line width for visual clarity in order to distinguish its boundary. An element 124, an element 126, an element 128, an element 130, and an element 132 at least partially overlap the element 122. By way of example, the element 122 is a background object or a watermark on the webpage 120, while the elements 124, 126, 128, 130, and 132 are foreground elements or objects that are layered in front of the element 122. As non-limiting, illustrative examples, the element 124 is a header title, the element 126 is a subtitle, and elements 128, 130, and 132 are different portions of body text.

The webpage 120 further includes a hidden element 134 (indicated by dashed lines) that overlaps with the element 126 as well as the element 122. The hidden element 134, for instance, represents an element that is present in the markup of the webpage 120 but is not visible to the user when the webpage 120 is rendered in the user interface 110. Content of the hidden element 134, including text, images, or other media, is not displayed via the display device 112, although the content may affect the layout and behavior of the webpage 120. With respect to z-layering, the element 122 has a lower z-index than the elements 124, 126, 128, 130, and 132, and the hidden element 134 has a higher z-index than the element 126.

The webpage 120 further includes an element 136, which, in this example, does not overlap with the other elements of the webpage 120. The elements 122, 124, 126, 128, 130, 132, and 136 and the hidden element 134 are included in the elements 118, which may include other elements in addition to those shown.

Attempts to select, for instance, the element 122 or the hidden element 134 via a conventional DOM inspector may be unsuccessful. As an example, the user may select a single location via a cursor 138 (or other selection tool), but because the element 122 is at least partially obscured by the elements 124, 126, 128, 130, and 132, it may be difficult to select the element 122 and not one of the elements 124, 126, 128, 130, and 132. That is, selection at a single location may result in only a top-most (e.g., highest z-index) element being selected for inspection. Moreover, because the hidden element 134 is not displayed, the user may not know where the hidden element 134 is located, and so it may not be possible to select the hidden element 134 using the existing techniques. The existing techniques also do not enable batch selection of multiple elements 118 at once since a single location is selected via the cursor 138.

Accordingly, the inspector tool 116 described herein includes functionality for selecting elements within a selection area 140 rather than a single location. By way of example, the inspector tool 116 may be activated via an option 142 that is user selectable (e.g., via the cursor 138) to access the element selection and inspection functionality of the inspector tool 116. For instance, the option 142 may be accessed as part of a developer tool panel 144 that is generated within the user interface 110 and enables access to the developer tool 104, including the inspector tool 116. The developer tool panel 144 may be opened via a toolbar, a menu, or another type of control functionality of the webpage 120. Once the option 142 is selected (as indicated in FIG. 1 by shading), the inspector tool 116 is activated and controlled via user input to the cursor 138 or other input device.

The user interface 110 receives, via the cursor 138 with the inspector tool 116 active, a dragging input that defines the selection area 140 on the webpage 120. As a non-limiting example sequence, the dragging input includes receiving a selection starting point 146 (e.g., a first location on the webpage 120) via a selection input that indicates selection via the cursor 138 (e.g., a click of a mouse button or touch of a touchscreen), a movement of the cursor 138 to a selection ending point 148 (e.g., a second location on the webpage 120) while the selection input is maintained (e.g., the mouse button is held down or the touch continues), and a release of the selection input at the selection ending point 148 (e.g., a release of the mouse button or withdrawal of the touch), as will be elaborated below with respect to FIG. 2. The selection area 140 may be visually indicated, for example, by a marquee selection area, a translucent overlay, or another type of appearance change that shows a boundary of the selection area 140 and/or the elements selected therein.

An element is selected by the inspector tool 116 if its position is within (e.g., completely within) the selection area 140. In the example depicted in FIG. 1, the elements 122, 128, 130, and 132 as well as the hidden element 134 are selected via the inspector tool 116 because these elements are within the boundary of the selection area 140, whereas the elements 124, 126, and 136 are not selected because they have regions that are at least partially outside of the selection area 140. This is reflected in selection results 150 shown in the developer tool panel 144, which lists the selected elements (e.g., by name) and lists, for example, their corresponding details for inspection. The details provided in the selection results 150 enable an HTML path, attributes (e.g., size, location, color, and so forth), cascading style sheet (CSS) class names, computed styles, and event listeners of the selected elements (e.g., the elements 122, 128, 130, and 132 and the hidden element 134 in the present example) to be inspected and/or modified.

Figure 2:
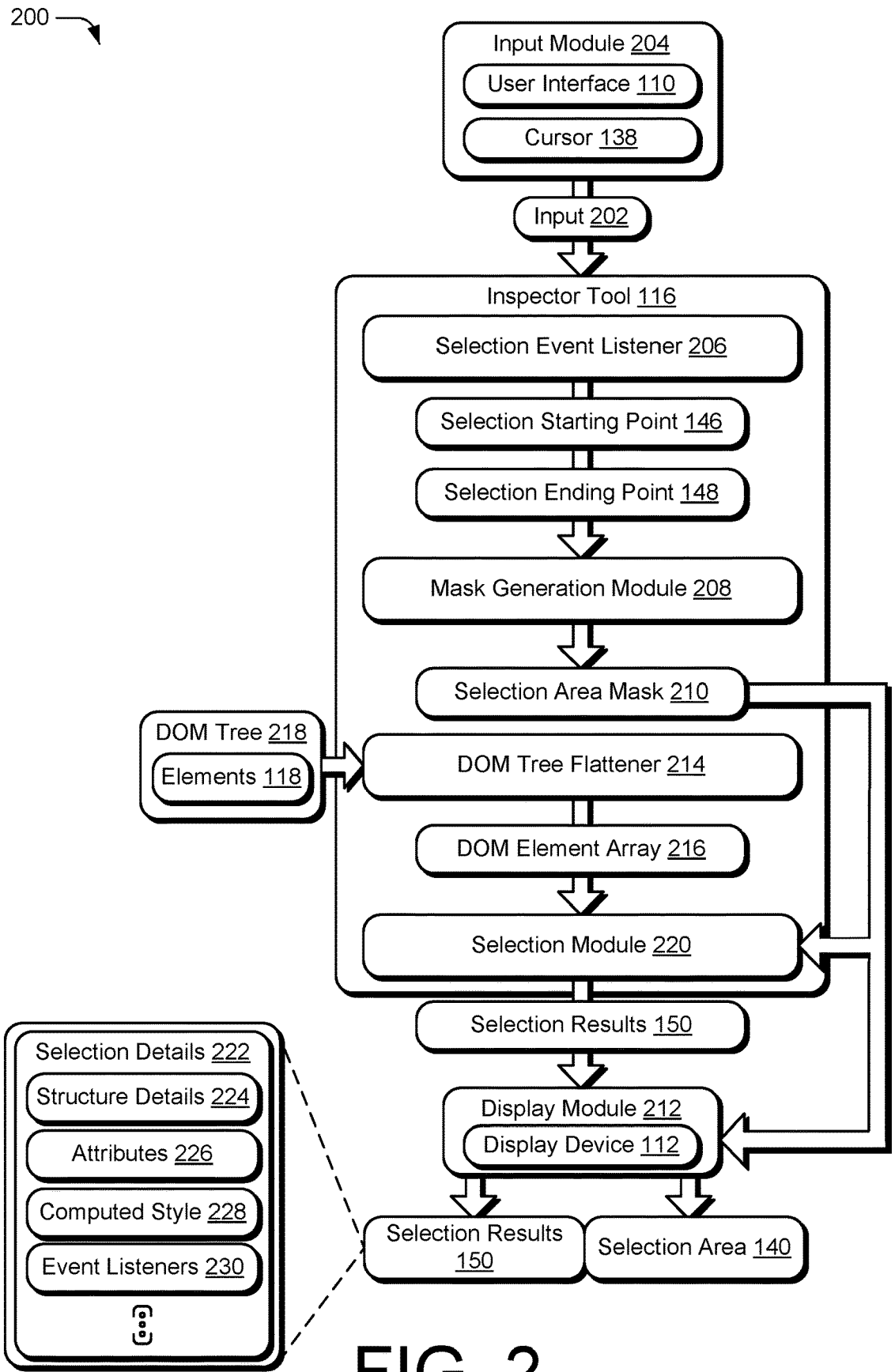
FIG. 2 depicts a system in an example implementation showing operation of the inspector tool of FIG. 1 in greater detail.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Area Selection-Based DOM Element Inspector FIG. 2 depicts a system 200 in an example implementation showing operation of the inspector tool 116 of FIG. 1 in greater detail. An input 202 is received by the inspector tool 116 via an input module 204. By way of example, the input module 204 includes the user interface 110 and the cursor 138. The input 202 includes, for example, a movement of the cursor 138 (e.g., a "mouse move" event), a selection input (e.g., a "mouse down" event) made via the cursor 138, and/or a selection release (e.g., a "mouse release" event) of the cursor 138. The input 202 may include more than one input, such as a series or sequence of inputs. The input 202 may be received in response to the option 142 being selected in the developer tool panel 144, for example, as shown in FIG. 1.

The inspector tool 116 includes a selection event listener 206. Broadly, an event listener is a programming construct or mechanism that includes functionality to monitor for and respond to events triggered by user interactions with the webpage 120 via the user interface 110, such as via the cursor 138. It enables the execution of specific code or functions when a particular event occurs. In one or more implementations, the selection event listener 206 allows the inspector tool 116 to monitor for and respond to selection events. By way of example, the selection event listener 206 monitors for and identifies the input 202. The selection event listener 206 may be implemented by a script (e.g., a JavaScript script) that is loaded to the webpage 120 when the inspector tool 116 is active, for example.

Based on the input 202, the selection event listener 206 identifies the selection starting point 146 and the selection ending point 148. By way of example, the selection starting point 146 corresponds to a global position of the cursor 138 on the webpage 120 (in contrast to a local position of the cursor 138 on the display device 112), such as with respect to coordinates of the cursor 138 when the selection input (e.g., the "mouse down" event) is received. The coordinates include a vertical (e.g., top-to-bottom) Y coordinate position and a horizontal (e.g., left-to-right) X coordinate position. The coordinates are relative to a pre-determined origin (0,0) on the webpage 120, where both X and Y coordinates have minimum values. As an example, the origin may be at the top-left corner of the webpage 120, and the X coordinate may increase as the cursor 138 moves from left to right. Continuing with this example, the Y coordinate may increase as the cursor 138 moves from top to bottom.

The selection event listener 206 tracks the coordinates of the selection starting point 146 and a current position of the cursor 138 as the cursor 138 moves until the selection input is released at the selection ending point 148. Thus, the selection ending point 148 corresponds to a global position of the cursor 138 on the webpage 120 when the selection input initiated at the selection starting point 146 is released. Because the selection input remains active during the movement of the cursor 138 between the selection starting point 146 and the selection ending point 148, this may be referred to as a "dragging input."

In at least one implementation, the inspector tool 116 includes a mask generation module 208 that receives the selection starting point 146 and the selection ending point 148. The mask generation module 208 includes functionality to generate a selection area mask 210 that encompasses an area (e.g., a rectangular area) defined by the selection starting point 146 and the selection ending point 148. By way of example, the selection starting point 146 defines a first horizontal boundary portion of the selection area mask 210 (typically a left-most boundary portion) and a first vertical boundary portion of the selection area mask 210 (typically an upper boundary portion), while the selection ending point 148 defines a second horizontal boundary portion of the selection area mask 210 (typically a right-most boundary portion) and a second vertical boundary portion of the selection area mask 210 (typically a lower boundary portion). The mask generation module 208 may calculate a difference between the coordinates of the selection starting point 146 and the selection ending point 148 (e.g., in both the vertical dimension and the horizontal dimension) to determine the size and shape of a boundary of the selection area mask 210.

In at least one implementation, the selection area mask 210 is generated by the mask generation module 208 as a separate layer having the highest z-index in a z-index hierarchical structure and ordering of the elements 118, as will be further described below. Because the selection area mask 210 has the highest z-index, the selection area mask 210 covers the other elements 118 on the webpage 120 in the particular region encompassed by its boundary.

The selection area mask 210 is received by a display module 212. The display module 212 includes functionality to control a display of the webpage 120, for example, as well as user interactions with the webpage 120 via the user interface 110. The display module 212 generates and broadcasts the selection area 140 as a visual indication of the selection area mask 210 on the display device 112. It is to be appreciated that, in at least one implementation, the mask generation module 208 receives the selection starting point 146 and the selection ending point 148 in real-time, as they are received from the input 202 and identified by the selection event listener 206, and updates the selection area mask 210 as the cursor 138 is moved in real-time. As such, the display module 212 may generate and broadcast the selection area 140 as a visual indication of the selection area mask 210 on the display device 112 in real-time, as the dragging input is received, based on the current position of the cursor 138 and before the selection ending point 148 is determined. As such, the selection area 140 may provide visual feedback to indicate the selection area mask 210 in real-time, as it is being drawn by the user.

The inspector tool 116 further includes a DOM tree flattener 214. The DOM tree flattener 214, for instance, may be implemented by a script (e.g., a JavaScript script) that is loaded to the webpage 120 when the inspector tool 116 is active. For example, "flattening" refers to the process of removing or disregarding the stacking order or depth information of elements in the z-hierarchy. A z-hierarchy, also known as a stacking context, defines the order in which elements are displayed on the webpage 120 in the user interface 110, such as which elements are on top of others, nested, and so forth. The DOM tree flattener 214 includes functionality that is executed to generate a DOM element array 216 from a DOM tree 218 of the elements 118 of the webpage 120. The DOM tree 218 is a representation of the structure and organization of the webpage 120. For example, the DOM tree 218 is a hierarchical tree-like structure that depicts relationships between the elements 118 within the webpage 120 as nodes with z-index values that denote a stacking order of the elements 118. In contrast, the DOM element array 216 specifies coordinate-based positions and dimensions of the elements 118 while ignoring z-index values. It is to be appreciated that the DOM tree flattener 214 includes functionality that generates the DOM element array 216 from the DOM tree 218 without modifying the elements 118 directly or removing/changing the z-hierarchy of the DOM tree 218 itself.

A selection module 220 receives the DOM element array 216 along with the selection area mask 210. The selection module 220 represents functionality of the inspector tool 116 that is executed to determine which elements 118 are covered by the selection area mask 210. By way of example, the selection module 220 compares the coordinate-based position and size (e.g., X, Y, width, and height values) of a given element of the elements 118 to the selection area mask 210. If the coordinate position and size of the given element are within the selection area mask 210 (e.g., completely within and overlapped by the selection area mask 210), the given element is selected and included in the selection results 150. In contrast, if at least a portion of the coordinate position and size of the given element is not within the selection area mask 210, the given element is not selected and is excluded from the selection results 150.

The selection results 150, including selection details 222, may be broadcast by the display module 212 for display by the display device 112. Examples of the selection details 222 include structure details 224 associated with a given selected element (e.g., a node selector, path expression, or XPath details), attributes 226 of the given selected element (e.g., size, location, color, and so forth), a computed style 228 of the given selected element, and event listeners 230 associated with the given selected element. Ellipses denote that other types of selection details may be included in addition to those depicted. The selection details 222 may be given for each element of a selected set of elements in the selection results 150 and may be editable by the user, for example, via interaction with the user interface 110.

Figure 3:
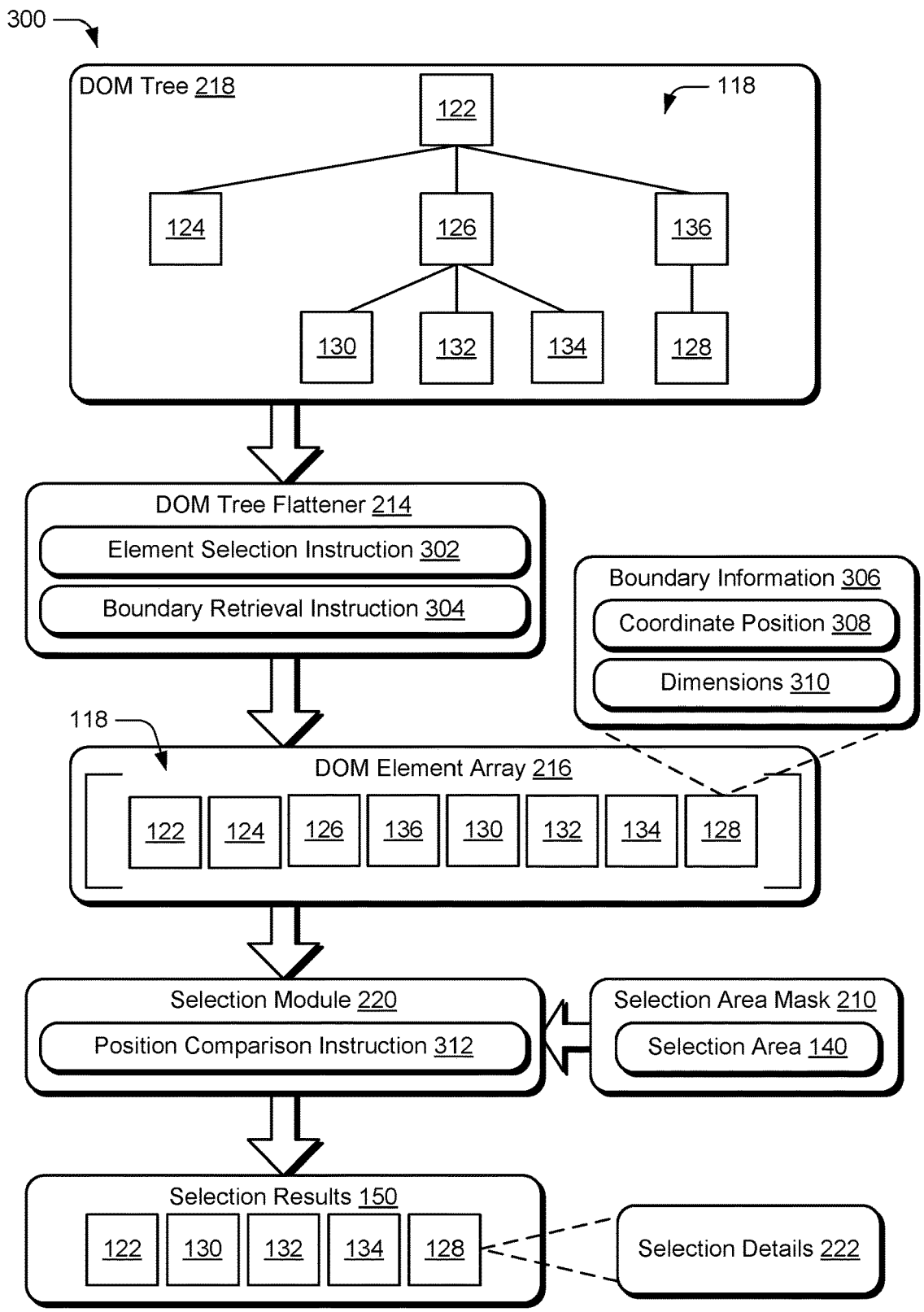
FIG. 3 depicts an example of a hierarchical structure of elements included as part of digital content.

FIG. 3 depicts an example 300 of a hierarchical structure of elements included as part of the digital content 106. In particular, the example 300 shows the DOM tree 218 including a hierarchical arrangement of the elements 118 depicted on the webpage 120 in FIG. 1.

In the example 300, the element 122 is a root node (e.g., having a z-index value of 0), and the elements 124, 126, and 136 are child nodes of the root node (e.g., having z-index values of 1) and sibling nodes with respect to each other. The elements 130, 132, and 134 are child nodes of the element 126 (e.g., having z-index values of 2) and grandchildren of the element 122. The element 128 is a child node of the element 136 (e.g., having a z-index value of 1) and another grandchild of the element 122. The hierarchical arrangement of nodes within the structure of the DOM tree 218 may be referred to as nesting. Nesting enables the representation of complex document structures and the organization of the elements 118 into meaningful groups or sections. Nesting further allows for the creation of hierarchical relationships, where child elements inherit properties or styles from their parent elements and are positioned relative to them, for example.

In at least one implementation, the DOM tree flattener 214 is implemented as an algorithm that includes one or more instructions for generating the DOM element array 216 from the DOM tree 218. The one or more instructions include, by way of example, an element selection instruction 302 and a boundary retrieval instruction 304. The element selection instruction 302 is executable to return a list of the elements 118 in the DOM tree 218 (e.g., the elements of the digital content 106 being evaluated via the inspector tool 116) and initiate a loop that iterates through the elements 118 to perform the boundary retrieval instruction 304 on the elements 118 individually. The boundary retrieval instruction 304 is executable to retrieve boundary information 306 of a currently evaluated element, such as by retrieving a bounding rectangle and associated properties (e.g., "top position," "bottom position," "left position," "right position," "width," and "height") that provide information about a coordinate position 308 and dimensions 310 (e.g., dimensional information) of the currently evaluated element relative to the webpage 120.

By iterating through the elements 118 individually and retrieving the corresponding boundary information 306, the DOM tree flattener 214 "flattens" the DOM in terms of processing each element independent of their hierarchical relationships and outputs this information as the DOM element array 216. While FIG. 3 shows the boundary information 306 with respect to a single element (e.g., the element 128) for illustrative clarity, it is to be appreciated that the DOM element array 216 also includes the boundary information 306 for the other elements in the array.

As noted above with respect to FIG. 2, the selection module 220 receives the DOM element array 216 and the selection area mask 210, which corresponds to the selection area 140 visually indicated on the user interface 110 (see FIG. 1). In one or more implementations, the selection module 220 is an algorithm that includes one or more instructions for comparing a size and a position of the selection area mask 210 and the boundary information 306 of the elements 118 in the DOM element array 216, represented in the example 300 as a position comparison instruction 312. The position comparison instruction 312 is executable to iteratively compare the boundary information 306 of individual elements 118 in the DOM element array 216 to that of the selection area mask 210. The selection module 220 adds a given element to the selection results 150 in response to the coordinate position 308 and dimensions 310 of the given element being within (e.g., entirely within) the selection area mask 210. In the example 300 and based on the arrangement of the elements 118 with respect to the selection area 140 shown in FIG. 1, the selection results 150 include the element 122, the element 130, the element 132, the hidden element 134, and the element 128. Moreover, the element 124, the element 126, and the element 136 are excluded from the selection results 150 in response to the corresponding boundary information 306 of these elements being at least partially outside of the selection area mask 210.

The selection results 150 further include the selection details 222 of the selected set of elements, including, for example, the structure details 224, the attributes 226, the computed style 228, and the event listeners 230, such as described above. Although the selection details 222 are shown with respect to a single selected element (e.g., the element 128) for illustrative clarity, it is to be appreciated that the selection results 150 also include the selection details 222 for the other selected elements in the set.

Example Procedure

This section describes an example of a procedure for an area selection-based DOM element inspector. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

Figure 4:
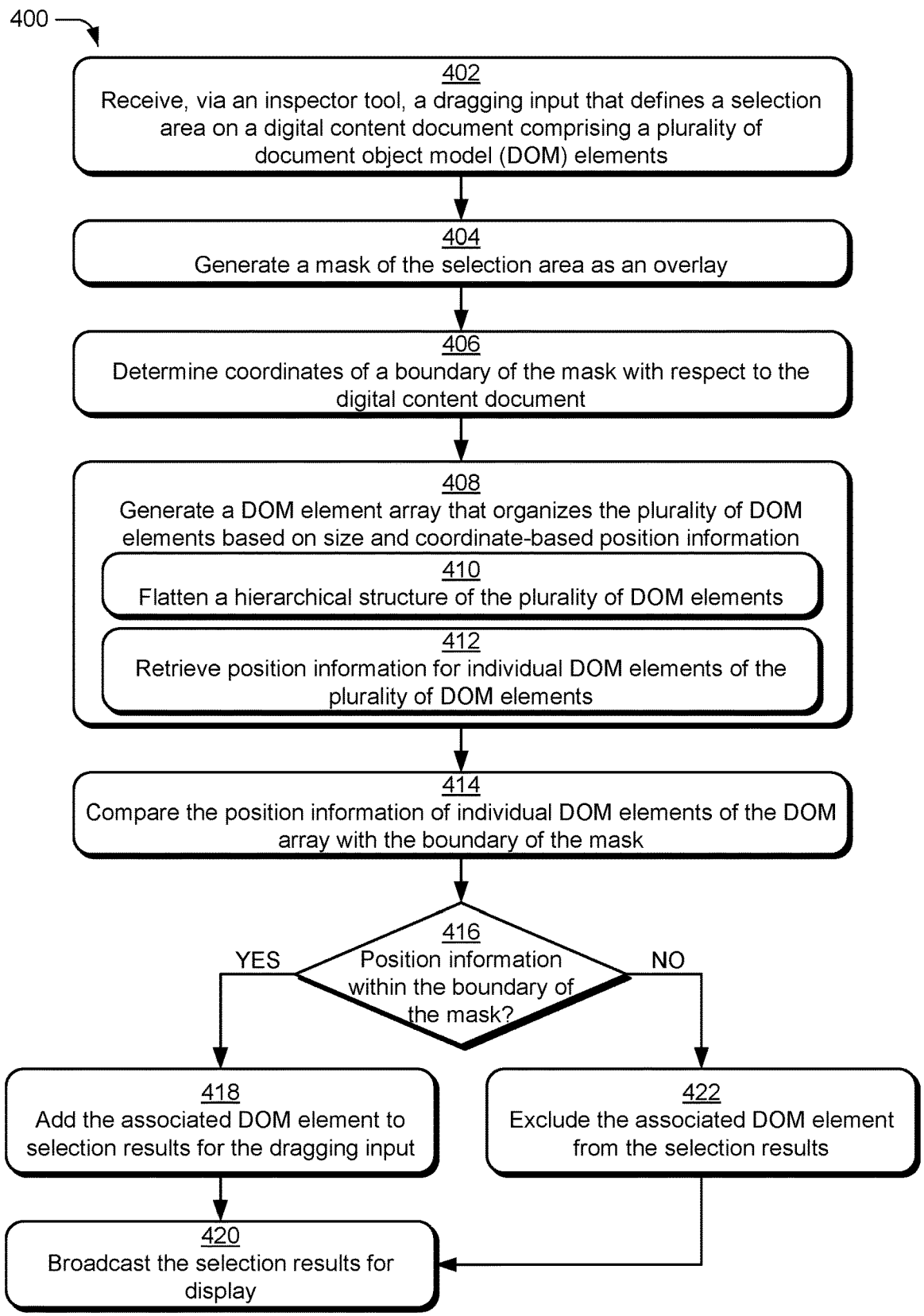
FIG. 4 is a flow diagram depicting an algorithm as a step-by-step procedure in an example of implementing an area selection-based inspector tool.

FIG. 4 is a flow diagram depicting an algorithm as a step-by-step procedure 400 in an example of implementing an area selection-based inspector tool. In at least one implementation, the procedure 400 is performable by the computing device 102. For example, the computing device 102 includes (or otherwise accesses) instructions stored in one or more computer-readable storage media that, when executed by at least one processor (or processing system), cause the at least one processor (or processing system) to perform the step-by-step procedure 400 as a series of operations. At least a portion one or more computer-readable storage media and/or the at least one processor may be remote from the computing device 102 and accessed via the network 114.

A dragging input that defines a selection area on a digital content document comprising a plurality of document object model (DOM) elements is received via an inspector tool (block 402). By way of example, the inspector tool 116 may be activated in response to receiving selection of an option 142 (e.g., via the cursor 138) within the developer tool panel 144. The developer tool panel 144, and thus the option 142, may be accessed via the display device 112 of the user interface 110. In particular, the display device 112 may display the digital content document, e.g., the webpage 120. Once activated, the inspector tool 116 is controlled via user input to the cursor 138 or another input device of the user interface 110.

The dragging input includes receiving a selection input (e.g., a "mouse down" event) at the selection starting point 146 and a release of the selection input (e.g., a "mouse release" event) at the selection ending point 148, with movement of the cursor 138 occurring between the selection starting point 146 and the selection ending point 148 on the digital content document. By way of example, the input module 204 tracks a coordinate position of the cursor 138 to determine the selection starting point 146 and the selection ending point 148, and the selection event listener 206 determines the occurrence of the "mouse down" and "mouse release" events.

A mask of the selection area is generated as an overlay (block 404). By way of example, the mask generation module 208 generates a selection area mask 210 that encompasses an area (e.g., a rectangular region) defined by the selection starting point 146 and the selection ending point 148. The selection area mask 210 may be visually indicated on the digital content document, such as via a marquee, highlighting, a translucent overlay, or another type of visual indication.

Coordinates of a boundary of the mask are determined with respect to the digital content document (block 406). By way of example, the coordinates are X (horizontal) and Y (vertical) values with respect to a pre-determined origin of the digital content document. The selection starting point 146 may define a first horizontal boundary coordinate and a first vertical boundary coordinate, while the selection ending point 148 may define a second horizontal boundary coordinate a second vertical boundary coordinate. For instance, the boundary of the mask is defined by the difference between the first horizontal boundary coordinate and the second horizontal boundary coordinate as well as the difference between the first vertical boundary coordinate and the second vertical boundary coordinate.

A DOM element array that organizes the plurality of DOM elements based on size and coordinate-based position information is generated (block 408). By way of example, prior to generating the DOM element array 216, the plurality DOM elements may be arranged in a hierarchical structure that denotes relationships between the plurality DOM elements with respect to a stacking order that defines how the various DOM elements are displayed with respect to each other. As such, DOM elements having a lower z-index value may be displayed behind DOM elements having a higher z-index value when the digital content document is rendered for display by the display module 212. The hierarchical structure of the DOM elements may be represented in the DOM tree 218, which depicts nesting relationships between the DOM elements (e.g., parent, child, sibling, grandchild) as nodes with z-index values that denote the stacking order. In contrast to the DOM tree 218, the DOM element array 216 specifies coordinate-based positions and dimensions of the plurality of DOM elements while disregarding the z-index values and nesting relationships.

Thus, in accordance with the techniques described herein, generating the DOM element array includes flattening the hierarchical structure of the plurality of DOM elements (block 410). By way of example, the flattening removes the z-index values and/or sets the z-index values of the plurality of DOM elements to be the same so that stacking, nesting, and so forth is not present in the DOM element array 216.

Generating the DOM array further includes retrieving position information for individual DOM elements of the plurality of DOM elements (block 412). By way of example, the position information includes the coordinate position 308 of the individual DOM element with respect to the origin of the digital content document and dimensions 310 (e.g., height and width values) of the individual DOM element. In one or more implementations, the position information defines a bounding rectangle of the individual DOM element. In one or more implementations, the DOM elements are organized by the position information in the DOM element array 216.

The position information of individual DOM elements of in the DOM array is compared with the boundary of the mask (block 414). By way of example, a width and X coordinate position of an individual DOM element is compared to horizontal boundary coordinates of the selection area mask 210, and a height and Y coordinate position of the individual DOM element is compared to vertical boundary coordinates of the selection area mask 210.

It is determined if the position information is within the boundary of the mask (block 416). By way of example, the position information is within the boundary of the mask if the bounding rectangle of the individual DOM element is entirely within, and thus fully overlapped by, the selection area mask 210. In contrast, the position information is not within the boundary of the mask if the bounding rectangle of the individual DOM element is at least partially outside of the selection area mask 210, such as when the selection area mask 210 partially overlaps the bounding rectangle or does not overlap the bounding rectangle.

If the position information is within the boundary of the mask, the associated DOM element is added to the selection results for the dragging input (block 418). By way of example, the associated DOM element becomes activated, which may include highlighting the associated DOM element or providing another visual indicator of selection. Additionally or alternatively, the selection results 150 may include a list of the DOM elements that are selected, referred to as a selected set. For instance, a first number of the plurality of DOM elements may have associated position information that is within the boundary of the mask, and thus identities (e.g., names) of the first number of the plurality of DOM elements may be added to the selection results 150. The first number may be a numerical value that corresponds to a portion of the plurality of DOM elements. Alternatively, in scenarios where the selection area mask 210 covers all of the plurality DOM elements, the first number corresponds the number of DOM elements included in the digital content document. In other scenarios where the selection area mask 210 covers none of plurality of DOM elements, the first number is zero.

The selection results are broadcast for display (block 420). By way of example, the selection results 150 are displayed via the display device 112 of the user interface 110, such as within the developer tool panel 144. In addition to listing the selected DOM elements in the set, the selection results 150 may further include or otherwise indicate selection details 222 associated with the respective DOM elements in the set. The selection details 222 may include, for example, structure details 224 of the associated DOM element, attributes 226 of the associated DOM element, the computed style 228 of the associated DOM element, and event listeners 230 attached to the associated DOM element.

Conversely, if the position information is not within the boundary of the mask, the associated DOM element is excluded from the selection results (block 422). By way of example, a second number of the plurality of DOM elements may have associated position information that is at least partially outside of the boundary of the mask, and thus identities (e.g., names) of the second number of the plurality of DOM elements are excluded from the selection results 150. The second number may be a numerical value that corresponds to a remaining portion of the plurality of DOM elements that are not included in the first number. Alternatively, in scenarios where the selection area mask 210 covers all of the plurality DOM elements, the second number is zero. In other scenarios where the selection area mask 210 covers none of plurality of DOM elements, the second number corresponds to the number of DOM elements included in the digital content document.

As such, the inspector tool described herein enables DOM elements to be selected based on their geometric position on the digital content document and independent from element levels (e.g., index values), thereby providing a more intuitive, convenient, and user-friendly interaction. The inspector tool described herein improves the user interface field by enabling efficient batch selection of DOM elements within an area (e.g., geometric region), regardless of whether an element is obscured and/or inaccessible due to overlap with other elements or hidden from display. By avoiding repeated mouse clicks and element selections/deselections, the inspector tool selection process may tie up fewer computing resources, thus increasing computing performance by making these computing resources available to perform other tasks.

Example System and Device

Figure 5:
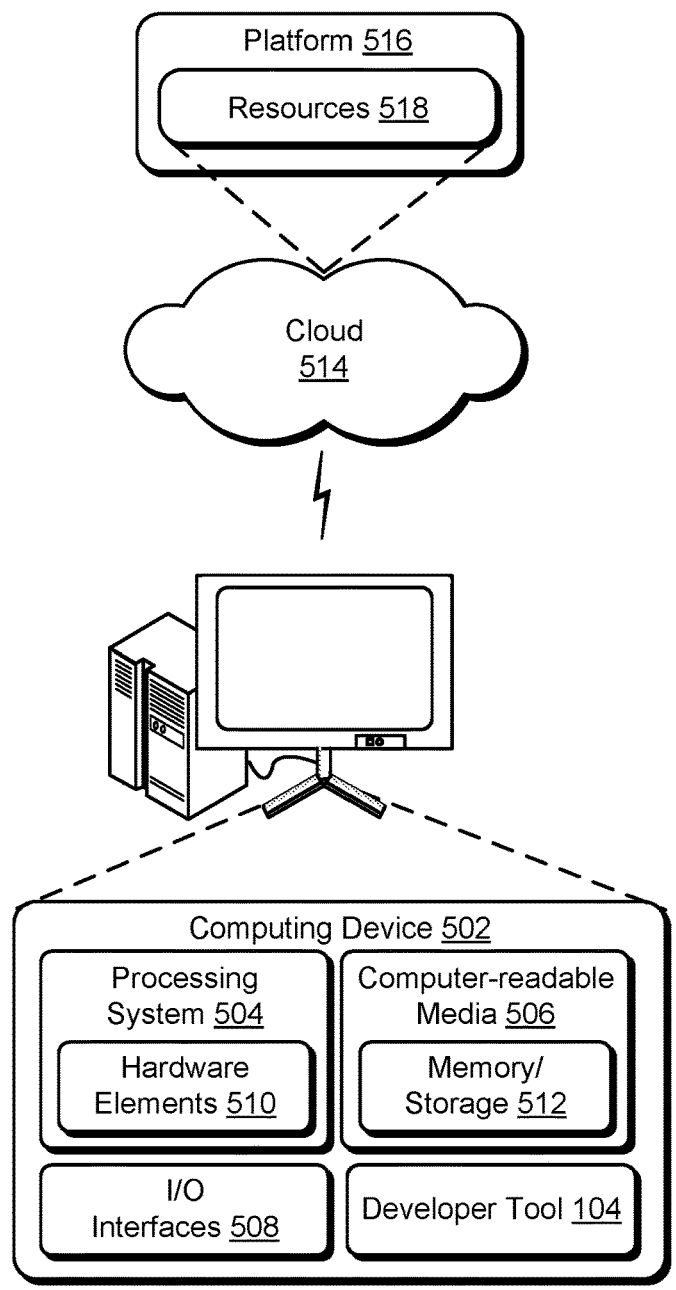
FIG. 5 illustrates an example system including various components of an example device that can be implemented as any type of computing device as described and/or utilized with reference to FIGS. 1-4 to implement embodiments of the techniques described herein.

FIG. 5 illustrates an example of a system generally at 500 that includes an example of a computing device 502 that is representative of one or more computing systems and/or devices that may implement the various techniques described herein. This is illustrated through inclusion of the developer tool 104. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically executable instructions.

The computer-readable media 506 is illustrated as including memory/storage 512. The memory/storage 512 represents memory/storage capacity associated with one or more computer-readable media. The memory/storage 512 may include volatile media (such as random-access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information thereon, such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 may include applications and/or data that can be utilized while computer processing is executed on servers that are remote from the computing device 502. Resources 518 can also include services provided over the Internet and/or through a subscriber network, such as a cellular or Wi-Fi network.

The platform 516 may abstract resources and functions to connect the computing device 502 with other computing devices. The platform 516 may also serve to abstract scaling of resources to provide a corresponding level of scale to encountered demand for the resources 518 that are implemented via the platform 516. Accordingly, in an interconnected device embodiment, implementation of functionality described herein may be distributed throughout the system 500. For example, the functionality may be implemented in part on the computing device 502 as well as via the platform 516 that abstracts the functionality of the cloud 514.

Conclusion

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A computer system for an area selection-based inspector tool, comprising:
 a processing system; and
 a computer-readable storage medium having instructions stored thereon that, when executed by the processing system, cause the processing system to perform operations comprising:
  receiving, via the area selection-based inspector tool, a dragging input that defines a selection area of a digital content document having a plurality of elements;
  selecting a set of elements of the plurality of elements that is positioned within the selection area by:
   determining a coordinate-based position of an element of the plurality of elements;
   determining coordinates of a boundary of the selection area;
   adding the element to the set of elements in response to the coordinate-based position of the element being within the coordinates of the boundary of the selection area; and
   excluding the element from the set of elements in response to the coordinate-based position of the element being outside of the coordinates of the boundary of the selection area; and broadcasting details of the selected set of elements for display.

2. The computer system of claim 1, wherein the plurality of elements is organized in a hierarchical structure, and the instructions further cause the processing system to perform operations comprising flattening the hierarchical structure in response to the area selection-based inspector tool being activated.

3. The computer system of claim 2, wherein flattening the hierarchical structure comprises:

retrieving boundary information for individual elements of the plurality of elements;

generating an array of the plurality of elements that disregards the hierarchical structure; and organizing the individual elements in the array based on the boundary information.

4. The computer system of claim 3, wherein the boundary information comprises a coordinate-based position and a dimension of the individual elements.

5. The computer system of claim 1, wherein the dragging input comprises:

receiving a selection input at a starting point having a first coordinate position on the digital content document; and receiving a release of the selection input at an ending point having a second coordinate position on the digital content document, different from the first coordinate position.

6. The computer system of claim 1, wherein the instructions further cause the processing system to perform operations comprising broadcasting an indication of the selection area for display while receiving the dragging input.

7. The computer system of claim 1, wherein the area selection-based inspector tool is activated in response to receiving a selection of an option in a developer tool panel broadcast for display via a user interface.

8. The computer system of claim 1, wherein the set of elements comprises a first element and a second element, and wherein the first element is displayed behind the second element on the digital content document.

9. The computer system of claim 1, wherein the details of the selected set of elements comprise at least one of a content, an attribute, and a style of respective elements of the selected set of elements, and wherein the instructions further cause the processing system to perform operations comprising enabling editing of the details of the selected set of elements.

10. A method for an area selection-based inspector tool, comprising:

receiving a dragging input that defines a boundary of a selection area on a webpage comprising a plurality of document object model (DOM) elements;

selecting at least one DOM element of the plurality of DOM elements based on positioning on the webpage relative to the boundary of the selection area by:

selecting the at least one DOM element in response the at least one DOM element being within the boundary of the selection area; and excluding remaining DOM elements of the plurality of DOM elements from selection in response to the remaining DOM elements being at least partially outside of the boundary of the selection area; and broadcasting details of the at least one DOM element for display.

11. The method of claim 10, wherein the plurality of DOM elements is organized in a hierarchical structure that defines layering of the plurality of DOM elements with respect to each other, and wherein the method further comprises:

generating a mask of the selection area;

arranging the mask to have a highest index in the hierarchical structure; and using the mask to compare positions of respective DOM elements of the plurality of DOM elements on the webpage with the boundary of the selection area.

12. The method of claim 10, wherein the plurality of DOM elements is organized in a hierarchical structure that defines layering of the plurality of DOM elements with respect to each other, and wherein selecting the at least one DOM element of the plurality of DOM elements based on the positioning on the webpage relative to the boundary of the selection area comprises:

retrieving coordinate-based position and dimensional information for individual DOM elements of the plurality of DOM elements;

organizing the individual DOM elements in an array based on the coordinate-based position and the dimensional information, independent from the hierarchical structure;

comparing the coordinate-based position and the dimensional information for the individual DOM elements to the boundary of the selection area; and selecting the at least one DOM element in response to the coordinate-based position and the dimensional information of the at least one DOM element being within the boundary of the selection area.

13. The method of claim 10, wherein broadcasting the details of the at least one DOM element for display comprises broadcasting the details in a developer tool panel that is displayed alongside the webpage in a user interface.

14. The method of claim 13, wherein the area selection-based inspector tool is activated in response to receiving, via the user interface, a selection of the area selection-based inspector tool in the developer tool panel.

15. One or more computer-readable storage media comprising instructions for an area selection-based inspector stored thereon that, responsive to execution by one or more processors, cause the one or more processors to perform operations comprising:

broadcasting a webpage having a plurality of digital content elements for display, the plurality of digital content elements organized in a hierarchical structure that defines z-index positions of individual elements of the plurality of digital content elements;

receiving, via input provided via the area selection-based inspector, a selection area on the webpage;

selecting a portion of the plurality of digital content elements based on positioning of the portion relative to the selection area, the selecting ignoring the z-index positions; and broadcasting inspection details of the portion of the plurality of digital content elements for display.

16. The one or more computer-readable storage media of claim 15, wherein selecting the portion of the plurality of digital content elements based on the positioning of the portion relative to the selection area comprises:

determining a coordinate-based position and size of an element of the plurality of digital content elements;

determining coordinates of a boundary of the selection area on the webpage;

adding the element to the portion in response to the coordinate-based position and size of the element being within the coordinates of the boundary of the selection area; and excluding the element from the portion in response to the coordinate-based position and size of the element being at least partially outside of the coordinates of the boundary of the selection area.

17. The one or more computer-readable storage media of claim 15, wherein the area selection-based inspector is activated via a developer tool option, and wherein the one or more computer-readable storage media include further instructions that, responsive to execution by the one or more processors, cause the one or more processors to perform operations comprising:

flattening a hierarchical structure of the plurality of digital content elements in response to the area selection-based inspector being activated;

generating a mask of the selection area; and broadcasting the mask of the selection area for display.

* * * * *